United States Patent [19]

Brown, Jr. et al.

[11] 4,305,446
[45] Dec. 15, 1981

[54] CAST TIRE AND METHOD OF MANUFACTURE

[75] Inventors: Jack E. Brown, Jr.; Brian M. Logan; Michael J. Trinko, all of Akron, Ohio

[73] Assignee: The Goodyear Tire & Rubber Company, Akron, Ohio

[21] Appl. No.: 216,697

[22] Filed: Dec. 15, 1980

Related U.S. Application Data

[63] Continuation of Ser. No. 40,796, May 21, 1979, abandoned, which is a continuation-in-part of Ser. No. 855,872, Nov. 30, 1977, abandoned.

[51] Int. Cl.³ .................................................. B60C 13/00
[52] U.S. Cl. ............................. 152/354 R; 152/357 A; 264/328.3
[58] Field of Search ............ 152/330 R, 330 RF, 374, 152/357 A, 354 R, 353 AC, 352 R, 352 A, 151, 361 R, 343; 156/110 CL, 125; 425/49, 50; 264/326, 328.3

[56] References Cited

U.S. PATENT DOCUMENTS

| | | | |
|---|---|---|---|
| 1,827,668 | 10/1931 | Musselman | 152/352 |
| 1,836,091 | 12/1931 | Shoemaker | 152/352 |
| 3,495,645 | 2/1970 | Gough | 152/330 R |
| 3,782,440 | 1/1974 | Depmeyer | 152/330 R |
| 3,789,900 | 2/1974 | Verdier | 152/361 R |
| 3,892,269 | 7/1975 | Powell et al. | 152/330 R |
| 3,954,131 | 5/1976 | Hoshino et al. | 152/353 |
| 3,980,606 | 9/1976 | Wermer | 156/110 CL |
| 4,006,767 | 2/1977 | Ford | 152/352 |
| 4,230,169 | 10/1980 | Boileau et al. | 152/353 R |

*Primary Examiner*—Michael W. Ball
*Attorney, Agent, or Firm*—Frank Pincelli

[57] ABSTRACT

An annular hollow tire with an inner surface having a generally positive radius of curvature and at least one circumferentially extending rib portion on the inner surface with a negative radius of curvature located at an area of the tire subject to high stresses to mitigate the stress concentrations in that area of the tire. The method of making the tire includes the steps of providing a tire mold with a core having a selected circumferentially extending portion on the outer surface with a negative radius of curvature for forming the rib portion, filling the space between the core and mold surface with an elastomeric precursor, heating to set the precursor and form the tire and removing the tire from the mold and the core from the tire.

15 Claims, 9 Drawing Figures

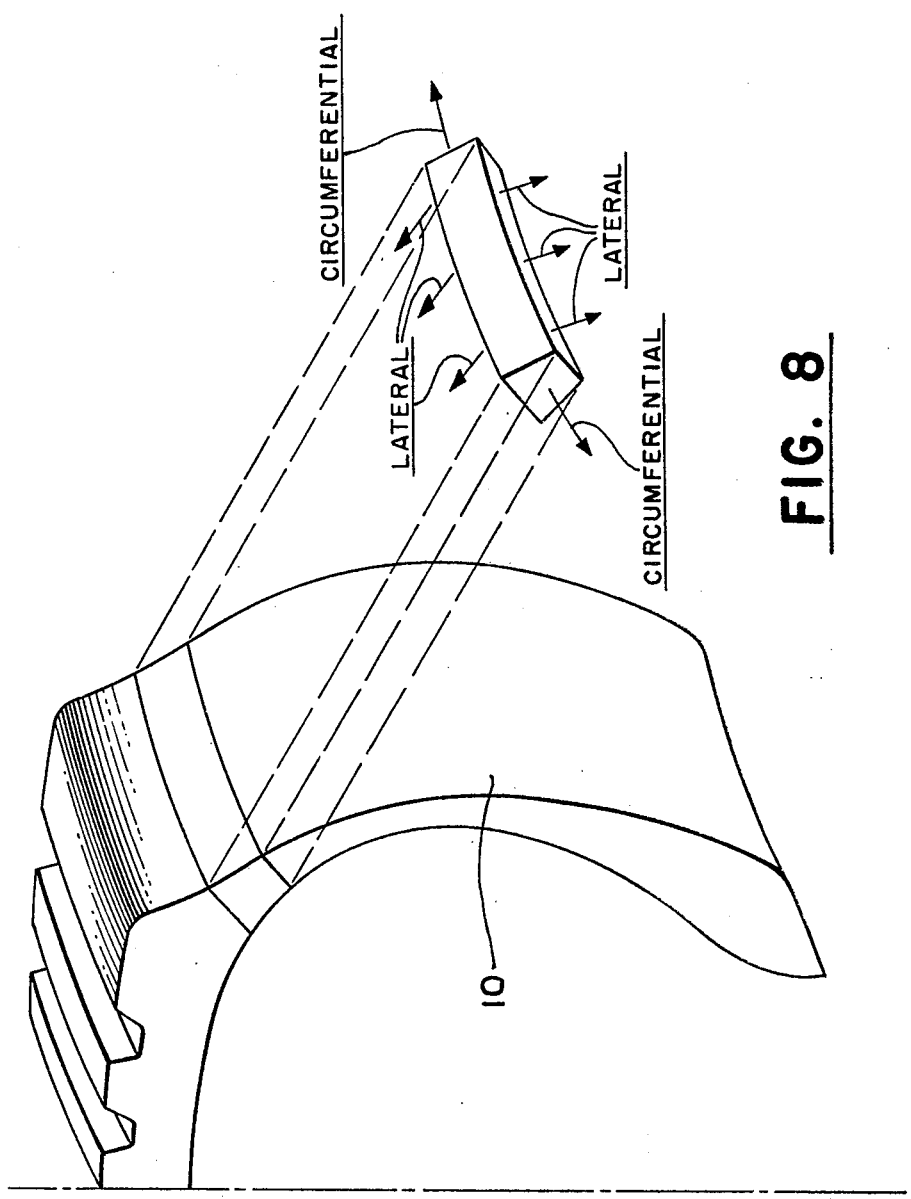

CAST TIRE AND METHOD OF MANUFACTURE

This is a continuation of application Ser. No. 40,796 filed May 21, 1979 now abandoned, which was a continuation-in-part of Ser. No. 855,872, filed Nov. 30, 1977, now abandoned.

This invention relates generally, as indicated, to a tire and method of manufacture where the tire is cast from an elastomeric material such as urethane. In the past, these tires have been made with the same cross-sectional shape as cord reinforced tires of rubber or other rubberlike material having the reinforcing plies extending from bead-to-bead.

The cord reinforced tires have been vulcanized in a mold with a bladder inside the tire engaging the inner surface of the tire. As a result, the inner surface has been kept smooth to facilitate the movement of the bladder into and out of the tire during the curing process. Stress distribution in the tires having the reinforcing plies extending from bead to bead has been provided by the selection and arrangement of the reinforcing plies and this has made possible tires with relatively smooth inner and outer surfaces.

It has been found that when cast tires are made with the same general cross section as the cord reinforced tires the walls of the tires must be made with a substantial thickness to provide the necessary strength. Also when reinforcing members are used in the cast tires high stresses are produced at the edges of the reinforcements which requires the wall thickness of the tire to be increased. The increased wall thickness is undesirable because it increases the weight and cost of the tires as well as causing higher operating temperatures.

With the foregoing in mind it is a principal object of this invention to provide a method of making a tire with a cross-sectional shape for improved distribution of stresses in the tire during operation.

Another object is to provide a tire with an inner surface having a generally positive radius of curvature and a circumferentially extending rib portion on the inner surface having a generally negative radius of curvature for mitigating the stress concentrations in the tire.

A further object is to provide a depth of the rib portion on the inner surface of the tire which is less than the thickness of the tire wall at the centerline of the tire for distributing the stresses in the tire.

A still further object is to provide a rib portion with a width and cross-sectional area having a centroid spaced from the centerline of the tire and related to the section width of the tire by a predetermined amount.

Another object is to provide rib portions for a tire having a reinforcing belt in the tread portion.

A further object is to provide rib portions for tires with more than one reinforcing belt in the tread portion.

A still further object is to provide rib portions for tires with reinforcing strips in the walls of the tire at portions other than the tread portion.

Another object is to provide a method of making a tire to be cast and cured in which the core has a grooved configuration to provide a circumferentially extending rib portion on the inner surface of the tire with a generally negative radius of curvature.

A further object is to provide a method in which reinforcing strips and belts are placed in the space between the core and the outer mold member and the core has a configuration to provide rib portions at locations adjacent the strips and belts.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

In the annexed drawings:

FIG. 8 is a partial perspective view illustrating the lateral and circumferential stresses in the tire.

Figure 1A:
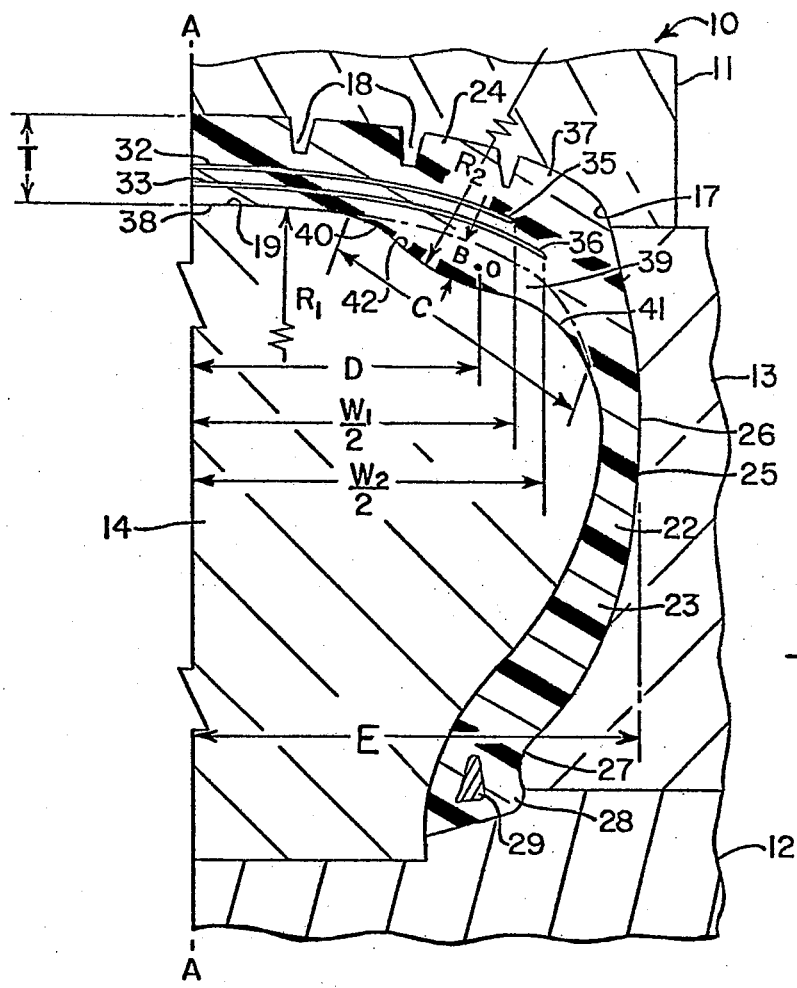
FIG. 1A is a radial sectional view on one side of a plane containing the centerline of an annular mold with a tire in the space between the outer mold member and the core, and parts being broken away.
Figure 1B:
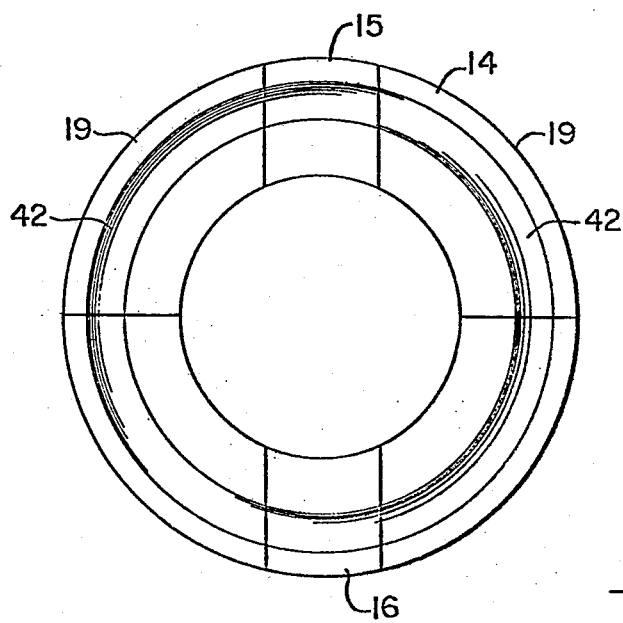
FIG. 1B is an elevation of the core shown in FIG. 1.

Referring to FIGS. 1A and 1B, an annular mold 10 is shown with an outer tread ring 11, an inner mold member 12 and side members 13, one of which is shown on one side of the circumferentially extending plane containing centerline A—A extending radially of the mold. A core 14 is positioned in the mold 10 and may be a segmented annular ring having removable segments 15 and 16, as shown in FIG. 1B, to facilitate removal of the core 14 from a tire after it is cast. The mold 10 may be heated or cooled and has an inner molding surface 17 extending over the tread ring 11 and side members 13. Circumferentially extending ribs 18 or other tread forming projections may be provided on the inner surface 17 of the tread ring 11 as shown in FIG. 1A.

The core 14 has an outer molding surface 19 which is in spaced relationship with the inner molding surface 17 of the mold 10 providing a cavity 22 between the core 14 and mold in which a tire 23, shown in section at one side of the plane containing centerline A—A, is molded. The tire 23 is of the annular pneumatic type and may be of an elastomeric material which is formed by casting such as by pouring or by injection of an elastomeric precursor. It is preferred for the construction herein described that the elastomeric material be of a polyurethane formed by casting a liquid polyurethane reaction mixture and curing, preferably by heating, to form a shaped rubbery tire.

A tread portion 24 of the tire 23 is formed in the cavity 22 between the core 14 and tread ring 11. A pair of circumferentially extending sidewalls 25 are formed between the side members 13 and core 14, and the sidewalls have outer peripheral edges 26 connected to the tread portion 24 and inner peripheral edges 27 at spaced-apart positions. The inner peripheral edges 27 are connected to bead portions 28 containing inextensible bead rings 29 of wire or other high modulus material.

In the embodiment shown in FIG. 1A, two circumferentially extending reinforcing belts 32 and 33 are molded in the tread portion 24 in overlapping relationship. The belts 32 and 33 have reinforcing cords extending generally circumferentially of the tire 23 and are of a material having a high modulus of elasticity such as aramid or steel. The belts 32 and 33 have widths W1 and W2, respectively, with the width W1 of belt 32 being less than the width W2 of belt 33 providing a step-off type construction. Edges 35 and 36 of belts 32 and 33, respectively, are generally in shoulder area 37 of the tire 23 to provide the strength required in operation of the tire.

As shown in FIG. 1A, the outer molding surface 19 of core 14 which corresponds with inner surface 38 of the tire 23 has a positive radius of curvature R1. For the purposes of this description, a positive radius of curvature is one in which the center of curvature is located inwardly of the outer molding surface 19 of the core 14 or inwardly of the inner surface 38 of the tire 23. By inwardly is meant toward the space enclosed by the sidewalls 25 and tread portion 24 of the tire or away from the molding surface 19 and towards the inner portion of the core 14.

In accordance with the invention, a circumferentially extending portion such as rib 39 is molded on the inner surface 38 of the tire 23 by a groove 42 in the outer molding surface 19 of the core 14. The rib 39 and groove 42 have a generally negative radius of curvature R2 which is defined as a surface for which the center of curvature is located outwardly of the molding surface 19 of the core 14 or outwardly of the inner surface 38 of the tire 23. By outwardly is meant a position away from the space within the tread portion 24 and sidewalls 25 of the tire or away from the core 14.

The maximum depth B of the rib 39 measured from the crest of the rib to the continuation of the inner surface 38, shown in dot-dash lines in FIG. 1A, is preferably 20 to 80 percent of the wall thickness T at the centerline A—A. The section width E of the tire 23 is measured from the centerline A—A to the axially outermost portion of the outer surface of the tire 23. The width C of the rib 39 is preferably of from 10 to 85 percent of the section width E of the tire. The centroid O of the cross-sectional area of the rib 39 is preferably spaced from the centerline A—A a distance D of from 25 to 95 percent of the section width E of the tire 23. In addition, the rib 39 is preferably located near the edges 35 and 36 of the belts 32 and 33. The centroid O of the cross-sectional area of the rib 39 is spaced from the centerline A—A the distance D and the difference between the distance and one-half the widths W1 or W2 of the belts 32 and 33 is equal to at least one-half the width C of the rib 39. It is understood that one-half the widths W1 and W2 of the belts 32 and 33 is equal to the distances between the edges 35, 36 and the centerline A—A.

The belts 32 and 33 reduce the stresses produced in the tire 23 significantly and limit the tire growth which has been a major problem with cast urethane tires. The rib 39 substantially reduces the stresses at the edges 35 and 36 of the belts 32 and 33 as well as in the shoulder area 37. It has been found that with the cross-sectional configuration of this invention the maximum stresses due to inflation of the tire and free spinning of the tire in the lateral and circumferential directions as computed by the FEALDS computer program (Finite Element Analysis for Load, Deformation and Stress) are substantially reduced. These maximum stresses are compared to the maximum stresses computed for a tire without the rib 39 and having an inner surface 39 following the contour of the dot-dash lines shown in FIG. 1A. For example, the maximum lateral stresses for comparable tires have been reduced by around 9 percent and the maximum circumferential stresses have been reduced around 50 percent. The circumferential stresses are those stresses in the circumferential direction of the tire and the lateral stresses are those stresses in a lateral direction of the tire as illustrated in FIG. 8.

Preferably the contour of the rib 39 is a smooth surface terminating at inflection point areas 40 and 41 where the surface of negative radius of curvature meets the tire inner surface 38 of positive radius of curvature. It is understood that the contour of the rib 39 may be varied without departing from the scope of the invention.

In the manufacture of tires 23 in accordance with this invention, the mold 10 is assembled around the core 14 providing the mold cavity 22 between the molding surface 19 of the core 14 and the inner molding surface 17 of the tread ring 11 and side members 13. The belts 32 and 33 and the bead rings 29 are positioned in the cavity 22 by spacers. The tire is then cast by filling the cavity 22 with an elastomeric precursor such as a liquid polyurethane reaction mixture which fills the groove 42 in the core 14 and upon heating and curing forms a rubbery polyurethane tire 23, including the rib 39. The tire 23 is then cooled after which the inner mold member 12 which may be split at the centerline A—A and the side members 13 are removed. The core 14 is then disassembled by removing segments 15 and 16 so that the remaining segments may be pulled out of the tire which may then be removed from the tread ring 11. It is understood that other forms of molds and cores may be used in accordance with the invention providing the core 14 has the necessary groove 42 for producing the rib 39 of the present invention. It is also understood that the cavity 22 may be circular or eliptical with a cross-sectional shape adapted to minimize the stresses in the tire 23. As shown in FIG. 1A, the wall thickness T of the tire 23 at the centerline and throughout the tire may be kept to a minimum through the provision of the rib 39 in the area of the tire subject to high stresses. It is also understood that the invention may be applied to tires having a cavity 22 which are not circular or eliptical but of other shapes to meet special operating requirements. The above description is directed to half the tire 23 on one side of the plane through centerline A—A; however, it is understood that this also applies to the half on the other side of the plane through centerline A—A.

Figure 2:
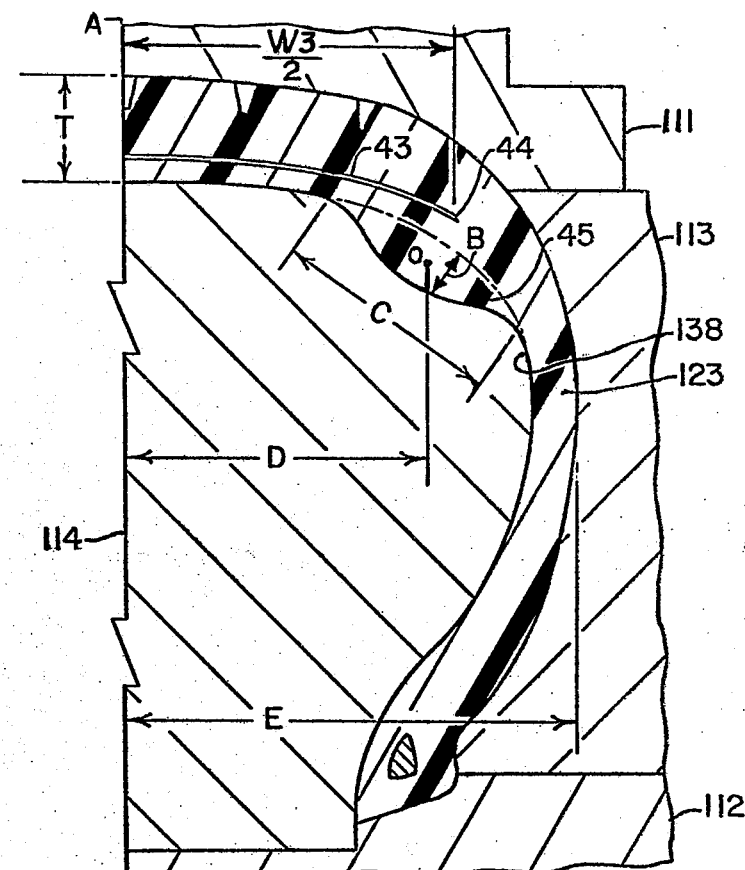
FIG. 2 is a radial sectional view like FIG. 1 showing modification of the invention.

Referring to FIG. 2, a modification is shown in which the tire 123 has only one belt 43 of reinforcing cords extending generally circumferentially of the tire and of a material having a high modulus of elasticity such as aramid or steel. The belt 43 has a circumferentially extending edge 44 and a rib 45 is provided at the inner surface 138 of the tire 123. The location and dimensions of rib 45 has a similar relationship to the width W3 of belt 43, wall thickness T at the centerline A—A, section width E, and position of the centroid O as the rib 39 of the embodiment shown in FIG. 1A has to these dimensions. For example, the difference between the distance D of the centroid O of the cross-sectional area of the rib 45 and one-half the width W3 of the belt 43 is equal to at least one-half the width C of the rib. The tire 123 is also cast in a manner similar to that described hereinabove for the tire 123 shown in FIG. 1A.

Figure 3:
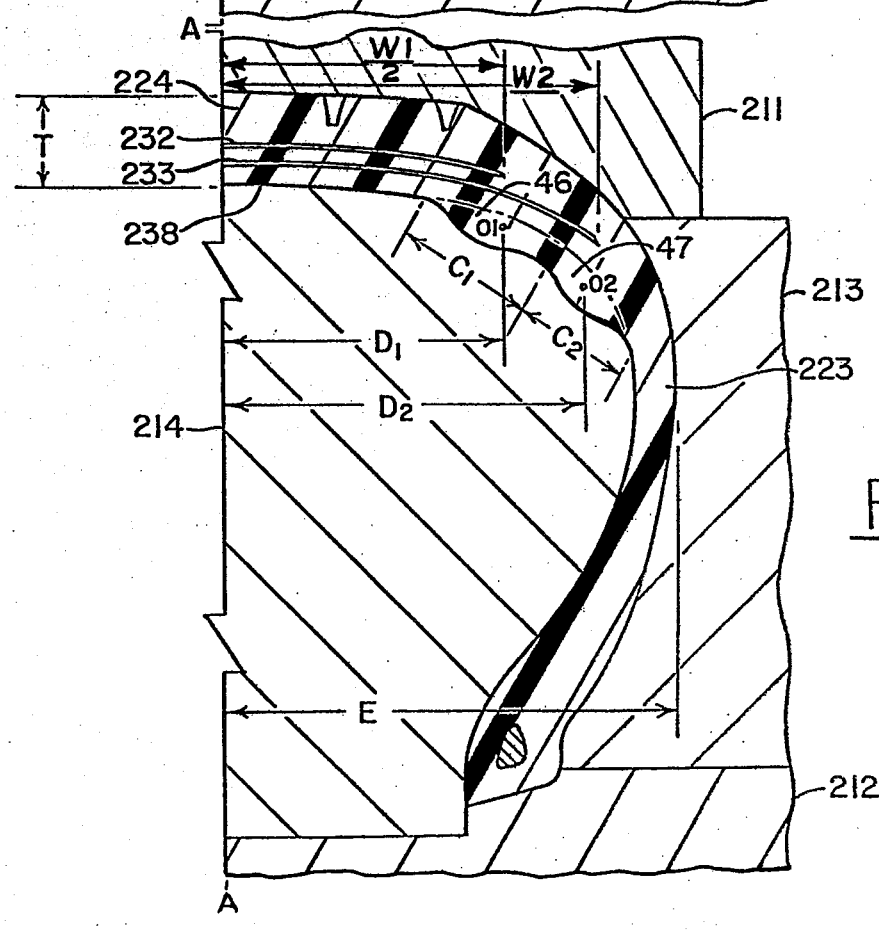
FIGS. 3, 4, 5, 6 and 7 are also radial sectional views like FIG. 1 showing other modifications of the invention.

Referring to FIG. 3, another modification is shown in which the tire 223 has belts 232 and 233 in the tread portion 224 and is provided with two ribs 46 and 47 at the inner surface 238 of the tire. The centroid O1 of the cross-sectional area of the rib 46 is spaced a distance D1 from the centerline A—A. The centroid O2 of the cross-sectional area of the rib 47 is spaced a distance D2 from the centerline. The belts 232 and 233 have widths W1 and W2, respectively.

In accordance with the invention, the ribs 46 and 47 have a similar relationship to the widths W1 and W2 of the belts 232 and 233, to wall thickness T at the centerline A—A, to section width E, and to positions of the centroids O1 and O2 as the rib 39 of the embodiment shown in FIG. 1A has to these dimensions. For example the difference between the distance D1 of the centroid O1 of the rib 46 and one-half the width W1 of the belt 232 is equal to at least one-half the width C1 of the rib. Also the difference between the distance D2 of the centroid O2 of the rib 47 and one-half the width W2 of the belt 233 is equal to at least one-half the width C2 of the rib 47. The tire 223 is also cast in a manner similar to that described hereinabove for the tire 23, shown in FIG. 1A.

Figure 4:
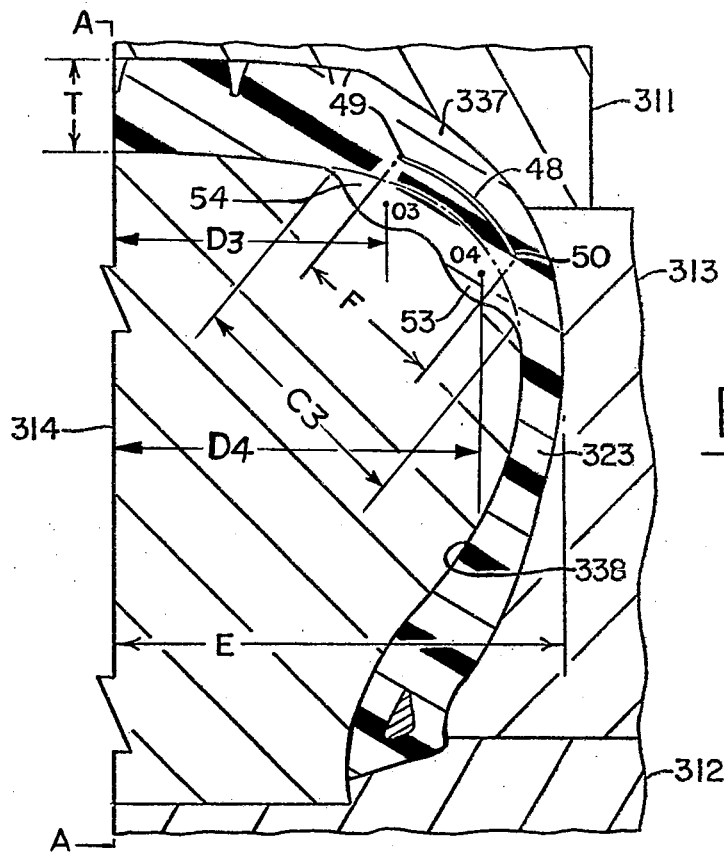

Referring to FIG. 4, a further modification is shown in which the tire 323 has a fabric reinforcing strip 48 positioned in the shoulder area 337. The reinforcing strip 48 extends circumferentially of the tire 323 and has generally parallel edges 49 and 50. Two ribs 53 and 54 are provided at the inner surface 338 of the tire 323. These ribs 53 and 54 may be connected and have a total width greater than the width F of the reinforcing strip 48 so that the ribs overlap the edges 49 and 50 of the reinforcing strip. Preferably the ribs 53 and 54 overlap the edges 49 and 50 by a distance less than the width F of the reinforcing strip 48.

In accordance with the invention, the ribs 53 and 54 have a similar relationship to the wall thickness T at the centerline A—A of the tire 323 and to section width E of the tire and to positions of the centroids O3 and O4 of the cross-sectional areas of the ribs 54 and 53, respectively, as the rib 39 of the embodiment shown in FIG. 1A has to these dimensions.

Figure 5:
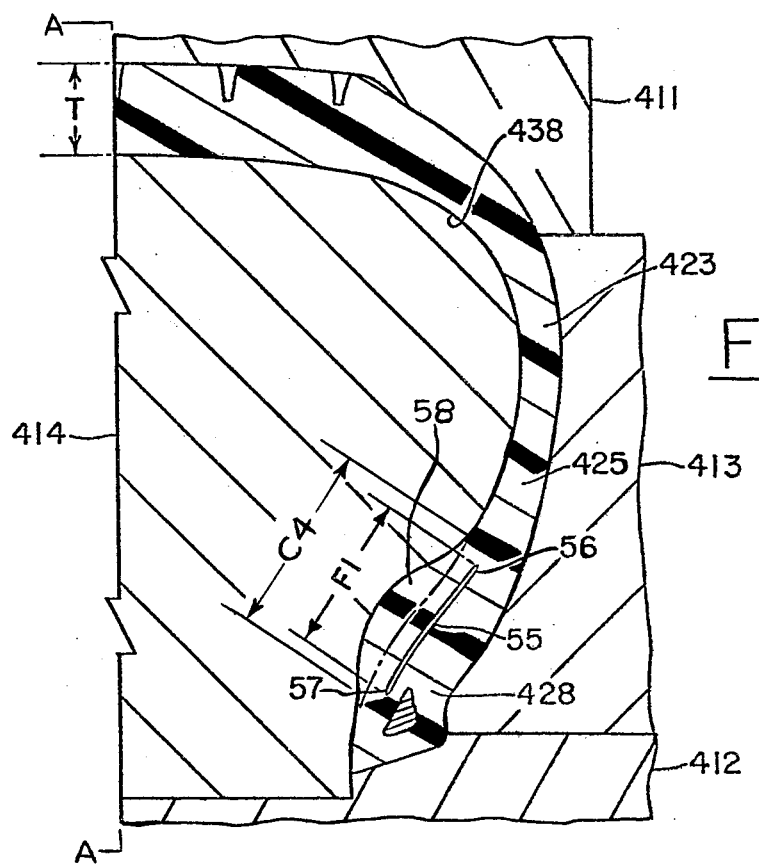

Referring to FIG. 5, another modification is shown in which the tire 423 has a circumferentially extending fabric reinforcing strip 55 located in the sidewall 425 adjacent the bead portion 428 and has generally parallel edges 56 and 57. A rib 58 is provided on the inner surface 438 of the tire 423 and has a width greater than the width F1 of the strip 55. Preferably the rib 58 overlaps each of the edges 56 and 57 by a distance less than the width F1 of the reinforcing strip 55.

Figure 6:
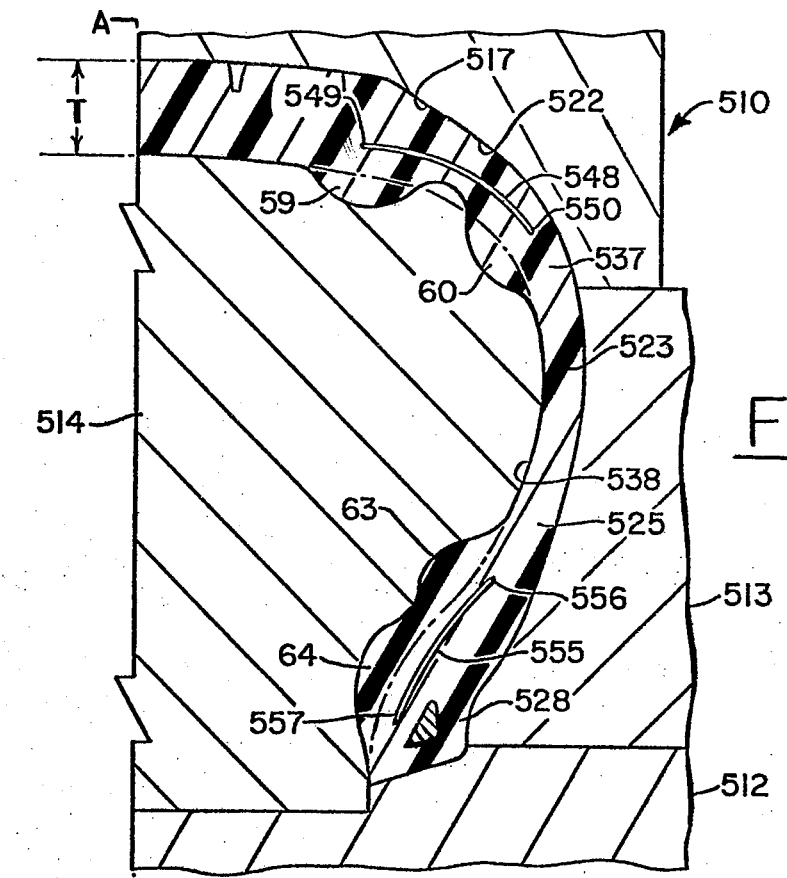

Referring to FIG. 6, a further modification is shown in which the tire 523 has a circumferentially extending fabric reinforcing strip 548 in the shoulder area 537 and a circumferentially extending fabric reinforcing strip 555 in the sidewall 525 in the proximity of the bead portion 528. In the same manner as shown in FIGS. 4 and 5, ribs 59 and 60 are provided at the inner surface 538 of the tire 523 in the proximity of the reinforcing strip 548. Parallel edges 549 and 550 of the reinforcing strip 548 are located in positions with the ribs 59 and 60 over the edges as shown in FIG. 6.

Ribs 63 and 64 are provided at the inner surface 538 of the tire 523 in the proximity of the reinforcing strip 555 which has parallel edges 556 and 557. The ribs 63 and 64 are located over the parallel edges 556 and 557 as shown in FIG. 6. The tire 523 is cast in a manner similar to that described hereinabove for the tire 23 shown in FIG. 1A except that instead of positioning the belts 32 and 33, the reinforcing strips 548 and 555 are positioned in the cavity 522 between the core 514 and inner molding surface 517 of the mold 510.

Figure 7:
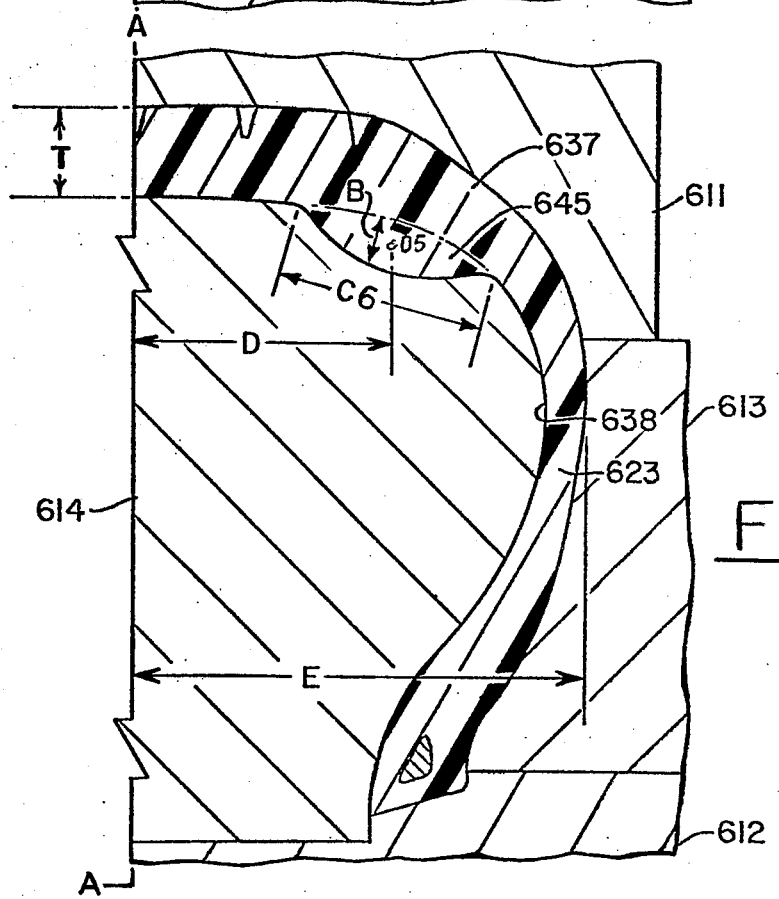

Referring to FIG. 7, a tire 623 like the tire 23 shown in FIG. 1A is shown without the reinforcing belts and the tread portion or reinforcing strips in the shoulder portion and sidewalls. A rib 645 is provided at the inner surface 638 of the tire in the shoulder area 637. The rib 645 has a similar relationship to the wall thickness T at the centerline A—A, to section width E and to the position of the centroid O5 as the rib 39 of the embodiment shown in FIG. 1A has to these dimensions. For example, the width C of the rib 645 is preferably of from 10 to 85 percent of the section width E of the tire and the centroid O5 of the cross-sectional area of the rib is preferably spaced from the centerline A—A a distance D of from 25 to 95 percent of the section width E of the tire 623. Also the tire 623 has a wall thickness T at the centerline A—A which is greater than the maximum depth B of the rib 645. The tire 623 is cast in a manner similar to that described hereinabove for the tire 23 shown in FIG. 1A except it is not necessary to position the belts in the tread area.

While certain representative embodiments and details have been shown for the purpose of illustrating the invention, it will be apparent to those skilled in the art that various changes and modifications may be made therein without departing from the spirit or scope of the invention.

We claim:

1. A cast pneumatic tire comprising a tread portion, a pair of circumferentially extending sidewalls with outer peripheral portions connected to said tread portion and spaced apart inner peripheral portions which are connected to bead portions respectively each containing an inextensible bead ring, said tread portion further provided with a circumferentially extending reinforcing belt structure having a pair of circumferential edges spaced from either side of said midcircumferential centerplane of the tire a first distance, each of said sidewalls consisting of an elastomeric material, an outer surface, an inner surface extending between said inner peripheral portions, a first pair of circumferentially extending rib portions, one located near each of said circumferential edges of said reinforcing belt structure on the inner surface and the centroid of the cross-sectional area of each of said rib portions being spaced from the midcircumferential plane a second distance measured axially of said tire from the midcircumferential centerplane of said tire and the difference between said first distance and second distance being equal to or less than one-half the width of either of said first rib portions, a circumferentially extending unfolded reinforcing strip with parallel edges is located in each of the bead portions of said tire, a second pair of rib portions, one being located adjacent said reinforcing strip on the inner surface and having a width greater than the width of said strip so that each of said second rib portions overlap the edges of said reinforcing strip.

2. A tire according to claim 1 wherein said tire has a wall thickness at the midcircumferential centerplane greater than the maximum depth of either of said first pair of circumferentially extending rib portions.

3. A tire according to claim 2 wherein said maximum depth of each of said rib portions of said first pair of rib portions is from 20 to 80% of said wall thickness at the midcircumferential plane of the tire.

4. A tire according to claim 1 wherein said tire has a half section width measured from the midcircumferential centerplane of the tire to the axially outermost portion of said tire, the said outer surface, and the width of each of said rib portions of said first pair of circumferentially extending rib portions is from 10 to 85% of said sectional width of said tire.

5. A tire according to claim 4 wherein the centroid of the cross-sectional area of each of said rib portions of said first pair of circumferentially extending rib portions is spaced respectively from the midcircumferential centerplane of said tire a distance from 20 to 85% of said half section of said tire.

6. A tire according to claim 5 wherein said tire has a wall thickness at the midcircumferential centerplane which is greater than the maximum depth of either of said rib portions of said first pair of circumferentially extending rib portions.

7. A tire according to claim 6 wherein a second circumferentially extending reinforcing belt is located in said tread portion and has a pair of circumferential edges spaced from either side said midcircumferential centerplane of the tire a third distance, each of said sidewalls are further provided with a third circumferentially extending rib portion on said inner surface of said tire with a negative radius of curvature said third rib portions being located near said second rib portions and the centroid cross-sectional area of each of said third rib portions being spaced from said midcircumferential centerplane a fourth distance measured axially of said tire and the difference between said third and fourth distances being equal to or less than one-half of the width of either of said third rib portions.

8. A tire according to claim 1 wherein said first rib portion and said third rib portion are spaced apart.

9. A tire according to claim 1 wherein each of said first rib portions overlap the edge of said reinforcing strip which it is associated with by a distance less than the width of said reinforcing strip.

10. A tire according to claim 1 wherein each of said sidewalls of said tire has a fourth circumferential rib portion located in said bead area of said tire, said second rib portion and said fourth rib portion being located respectively over at least one edge of said reinforcing strip.

11. A method of making a cast pneumatic tire having a tread portion, a pair of circumferentially extending sidewalls with outer peripheral portions connected to said tread portion and spaced apart inner peripheral portions, said sidewalls consisting of an elastomeric material, said tread portion being provided with a circumferentially extending reinforcing belt structure having a pair of circumferential edges spaced from either side of said midcircumferential centerplane of the tire a first distance, said inner peripheral portion each being provided with a circumferentially ending reinforcing strip with parallel edges, comprising the steps of:

providing an annular rigid tire mold having a mold cavity with an inner molding surface for forming the outer surface of said tire;

providing an annular rigid core inside said mold having an outer molding surface spaced from said inner molding surface;

providing said outer molding surface with a general positive radius of curvature for forming the inner surface of the tire;

providing a pair of circumferentially extending portions on said outer surface of said core with a negative radius of curvature for forming areas of increase thickness of said tire in each of said sidewalls which are subjected to high stresses, casting said tire by filling the space between said outer and inner molding surface with an elastomeric precursor, setting the precursor to form in each of said sidewalls of said tire with a first circumferentially extending rib and a second circumferentially extending rib, said first circumferentially extending rib being located near said circumferential edge of said reinforcing belt structure and the centroid of the cross-sectional area of said rib being spaced from the midcircumferential plane a second distance measured axially of said tire from the midcircumferential centerplane of said tire and a difference between said first distance and second distance being equal to or less than one-half the width of said first rib portion, said second circumferential rib portion located adjacent said reinforcing strip and having a width greater than the width of said reinforcing strip so that said second rib portion overlaps the edges of said reinforcing strip;

removing said tire from said mold cavity.

12. The method according to claim 11 wherein said elastomeric material is polyurethane formed by casting a liquid polyurethane.

13. The method according to claim 11 wherein said elastomeric material is polyurethane and said tire is cast by filling said space between said outer and inner molding surface with said elastomeric precursor of liquid polyurethane reaction mixture and curing said tire by heating.

14. The method according to claim 13 including providing said outer and inner molding surface in spaced apart position wherein the distance between said surface at the centerline of said mold is greater than the depth of said circumferentially extending portion of said outer surface of said core with said negative radius of curvature so that when the tire is cast the wall thickness at the centerline will be greater than the maximum depth of said first rib.

15. The method according to claim 14 further providing a depth for said first circumferentially extending rib being from 20% to 80% of the distance between said outer and inner molding surface at the centerline.

* * * * *

UNITED STATES PATENT AND TRADEMARK OFFICE
CERTIFICATE OF CORRECTION

PATENT NO. : 4,305,446
DATED : December 15, 1981
INVENTOR(S) : Jack E Brown, Jr; Brian M Logan; and Michael J Trinko It is certified that error appears in the above-identified patent and that said Letters Patent are hereby corrected as shown below:

Column 3, line 63, "39" should read -- 38 --.

Column 4, line 61, "123" should read -- 23 --.

Signed and Sealed this

Nineteenth Day of October 1982

[SEAL]

Attest:

GERALD J. MOSSINGHOFF

Attesting Officer     Commissioner of Patents and Trademarks